United States Patent
Marko et al.

(10) Patent No.: US 7,075,946 B2
(45) Date of Patent: Jul. 11, 2006

(54) METHOD AND APPARATUS FOR AUDIO OUTPUT COMBINING

(75) Inventors: Paul Marko, Boca Raton, FL (US); Craig Wadin, Sunrise, FL (US)

(73) Assignee: XM Satellite Radio, Inc., Washington, DC (US)

( * ) Notice: Subject to any disclaimer, the term of this patent is extended or adjusted under 35 U.S.C. 154(b) by 968 days.

(21) Appl. No.: 09/968,945

(22) Filed: Oct. 2, 2001

(65) Prior Publication Data

US 2003/0063628 A1    Apr. 3, 2003

(51) Int. Cl.
*H04H 1/04* (2006.01)
*H04B 7/212* (2006.01)

(52) U.S. Cl. ............ 370/487; 370/321; 370/458; 725/70

(58) Field of Classification Search .......... 370/321, 370/352, 395.5, 401, 442, 458, 498, 535, 370/540, 395.4; 381/2, 14, 16; 709/231; 725/67, 70, 71, 105, 118
See application file for complete search history.

(56) References Cited

U.S. PATENT DOCUMENTS

| | | | | |
|---|---|---|---|---|
| 5,647,008 A | * | 7/1997 | Farhangi et al. | 381/119 |
| 5,928,330 A | * | 7/1999 | Goetz et al. | 709/231 |
| 6,153,821 A | * | 11/2000 | Fay et al. | 84/634 |
| 6,161,089 A | * | 12/2000 | Hardwick | 704/230 |
| 6,311,161 B1 | * | 10/2001 | Anderson et al. | 704/500 |
| 6,907,020 B1 | * | 6/2005 | Periyalwar et al. | 370/337 |
| 2002/0046405 A1 | * | 4/2002 | Lahr | 725/87 |
| 2003/0009765 A1 | * | 1/2003 | Linden et al. | 725/95 |

* cited by examiner

*Primary Examiner*—Frank Duong
*Assistant Examiner*—John Shew
(74) *Attorney, Agent, or Firm*—Akerman Senterfitt

(57) ABSTRACT

A receiver unit (500) capable of combining a plurality of streaming data channels includes a receiver and a channel decoder (510) for receiving over the air in a time division multiplex signal the plurality of streaming data channels. The receiver unit further includes at least one decoder (502) for decoding at least two of the plurality of streaming data channels to provide a plurality of decoded signals, a combiner (508) for combining the plurality of decoded signals to provide a combined signal, and an audio output for outputting the combined signal as audio.

16 Claims, 3 Drawing Sheets

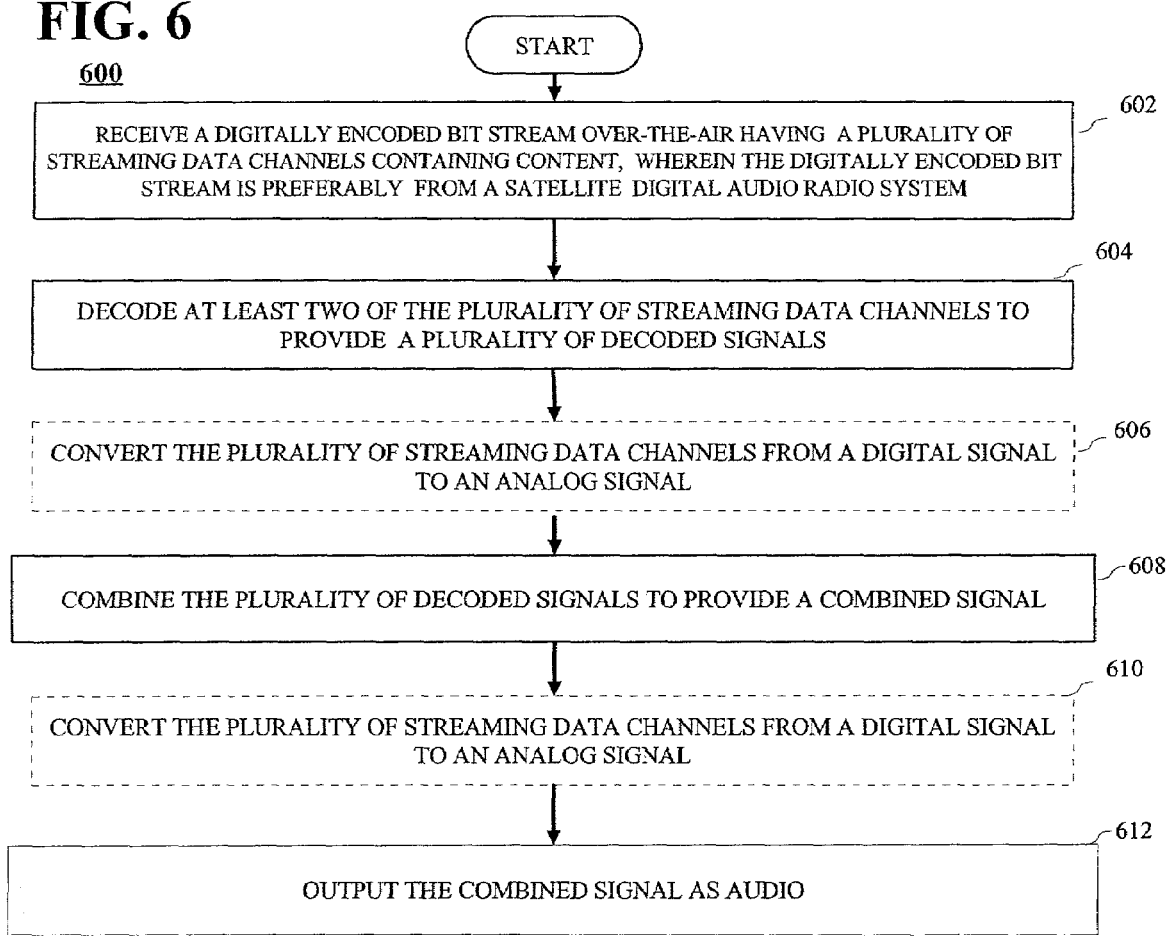

METHOD AND APPARATUS FOR AUDIO OUTPUT COMBINING

CROSS-REFERENCE TO RELATED APPLICATIONS (not applicable)

FIELD OF THE INVENTION

The invention relates generally to a method and apparatus for combining channels, and more particularly to a method and apparatus for combining audio channels in a single output.

BACKGROUND OF THE INVENTION

The mixing and combining of audio signals has been done in the context of multimedia computing. For example, U.S. Pat. No. 5,647,008 issued Jul. 8, 1997 to Farhangi et al. and assigned to Aztech Systems, Ltd. (hereinafter '008), discusses a method of digitally mixing multiple audio signals having independent sources, sampling rates and formats. Prior to mixing, the multiple audio input signals are converted to a common sampling rate before they are digitally mixed. To normalize the signals into a common sampling rate, the audio inputs are either interpolated or decimated at a rate that minimizes the loss of information from the audio input signals. Although some of these techniques can be utilized to enhance the present invention, the environment of digital audio radio (whether satellite or terrestrial based or both) has unique problems and configurations that require a different solution.

Satellite radio operators provide digital quality radio broadcast services covering the entire continental United States. These services offer approximately 100 channels, of which nearly 50 channels in a typical configuration that provide music with the remaining stations offering news, sports, talk and data channels. Digital radio may also be available in the near future from conventional analog radio broadcasters that will provide a terrestrial based system using signals co-located in the AM and FM bands.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHZ) of the electromagnetic spectrum for satellite digital broadcasting, 12.5 MHz of which are currently owned by one company and another 12.5 MHz of which are owned by the assignee of the present application "XM Satellite Radio Inc."

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Some mobile receivers will be capable of simultaneously receiving signals from two satellites and one terrestrial repeater for combined spatial, frequency and time diversity, which provides significant mitigation of multi-path interference and addresses reception issues associated with blockage of the satellite signals.

In accordance with XM Satellite Radio's unique scheme, the 12.5 MHZ band will be split into 6 slots. Four slots will be used for satellite transmission. The remaining two slots will be used for terrestrial reinforcement.

In accordance with the XM frequency plan, each of two geostationary satellites will transmit identical or at least similar program content. The signals transmitted with QPSK modulation from each satellite (hereinafter satellite I and satellite 2. For reliable reception, the LOS signals transmitted from satellite 1 are received, reformatted to Multi-Carrier Modulation (MCM) and rebroadcast by terrestrial repeaters. The assigned 12.5 MHZ bandwidth (hereinafter the "XM" band) is partitioned into two equal ensembles or program groups A and B. Each ensemble will be transmitted by each satellite on a separate radio frequency (RF) carrier. Each RF carrier supports up to 50 channels of music or data in Time Division Multiplex (TDM) format. Currently, there is no existing receiver that can combine the various channels from the TDM format into a combined audio signal.

Thus, in a digital audio radio system such as the system described above, a need exists for a device that enables a receiver to combine audio from various channels from a signal transmitted in the TDM format.

SUMMARY OF THE INVENTION

In a first aspect of the present invention, a method of combining a plurality of streaming data channels comprises receiving the plurality of streaming data channels over the air in a time division multiplex signal and decoding the time division multiplex signal wherein at least two of the plurality of streaming data channels are further decoded to provided a plurality of decoded signals. The method further comprises the step of combining the plurality of decoded signals to provide a combined signal and the step of outputting the combined signal as audio.

In a second aspect of the present invention, a receiver unit capable of combining a plurality of streaming data channels comprises a receiver and a channel decoder for receiving over the air in a time division multiplex signal the plurality of streaming data channels. The receiver unit further comprises at least one decoder for decoding at least two of the plurality of streaming data channels to provide a plurality of decoded signals, a combiner for combining the plurality of decoded signals to provide a combined signal, and an audio output for outputting the combined signal as audio.

In a third aspect of the present invention, a system for combining a plurality of streaming data channels comprises in addition to the receiver unit described above, at least two encoders for producing streaming data on the plurality of streaming data channels and at least one transmitter for transmitting in a time division multiplex signal the streaming data on the plurality of data channels.

BRIEF DESCRIPTION OF THE DRAWINGS

FIG. 6 is a flowchart illustrating a method in accordance with the present invention.

DETAILED DESCRIPTION OF THE DRAWINGS

Figure 1:
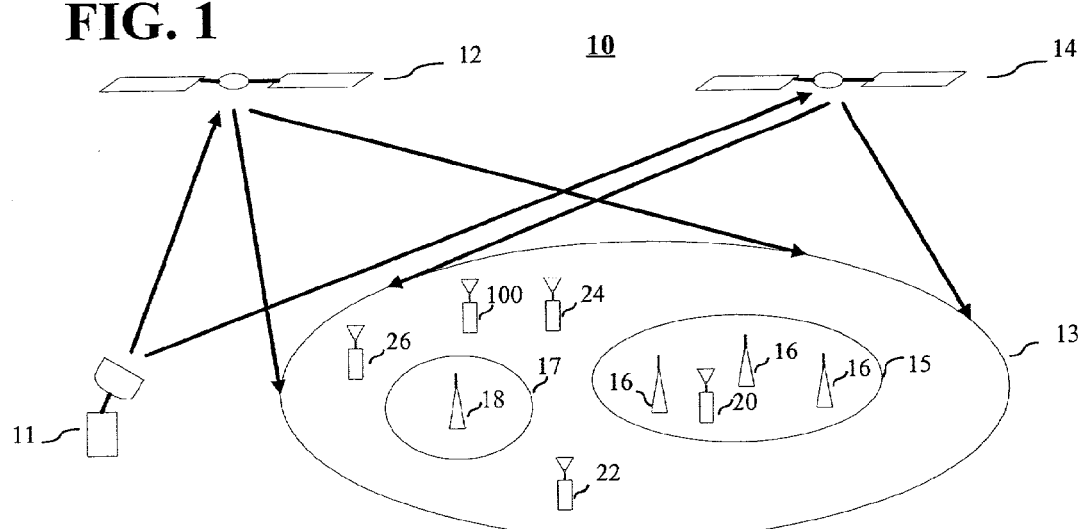
FIG. 1 illustrates a Satellite digital audio radio service system architecture in accordance with the present invention.

Referring to FIG. 1, satellite radio operators provide digital radio service to the continental United States. Briefly, the service provided by XM Satellite Radio includes a satellite X-band uplink 11 to two satellites (12 and 14) which provide frequency translation to the S-band for re-transmission to radio receivers (100, 20, 22, 24, and 26) on earth within the coverage area 13. Radio frequency carriers from one of the satellites are also received by terrestrial repeaters (16 and 18). The content received at the repeaters is retransmitted at a different S-band carrier to the same radios (20) that are within their respective coverage areas (15 and 17). These terrestrial repeaters facilitate reliable reception in geographic areas where LOS reception from the satellites is obscured by tall buildings, hills, tunnels and other obstructions. The signals transmitted by the satellites 12 and 14 and the repeaters are received by SDARS receivers 20–26 as well as receiver unit 100. As depicted in FIG. 1, the receivers may be located in automobiles, handheld or stationary units for home or office use. The SDARS receivers are designed to receive one or both of the satellite signals and the signals from the terrestrial repeaters and combine or select one of the signals as the receiver output.

Figure 2:
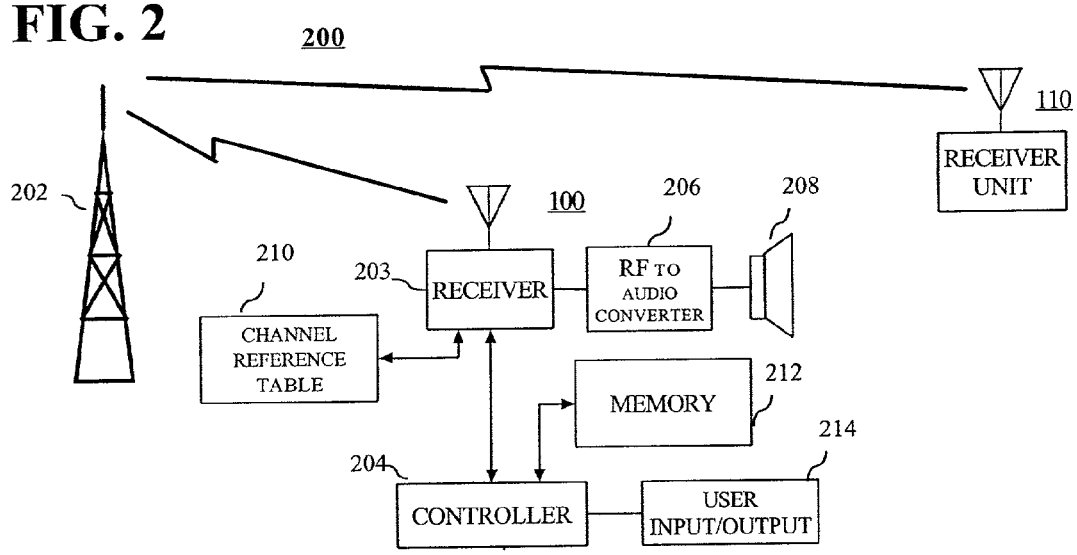
FIG. 2 is a block diagram illustrating a terrestrial based digital audio radio service system architecture in accordance with the present invention.

Referring to FIG. 2, a terrestrial based radio communication system 200 is shown in accordance with present invention. The system 200 preferably comprises a transmission station 202 that transmits signals similar to the repeater stations described above or alternatively could be other transmission formats such as FM, or other modulation techniques suitable for transmission of digital audio. The system 200 also preferably includes a plurality of receiver units (100 and 110 for example) each preferably having a receiver 203, memory 210 and 212 preferably containing a channel reference table and a desired content descriptor list respectively, a controller 204, a user input/output 214 (such as keypads and displays), and a radio frequency to audio converter 206 for playing audio via speaker 208.

Figure 3:
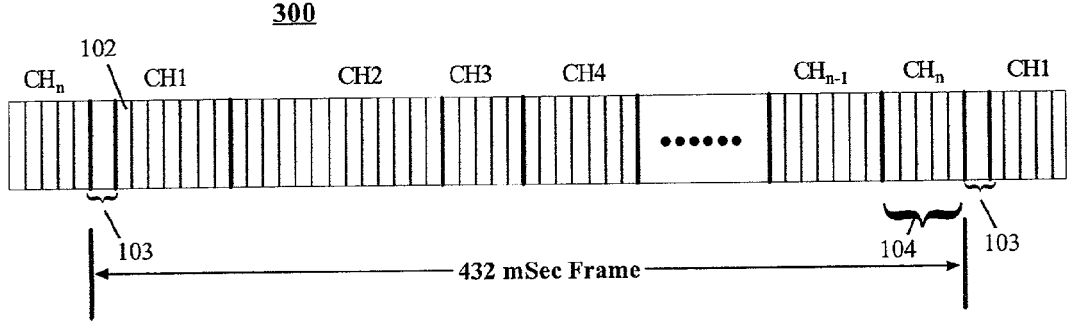
FIG. 3 is a diagram illustrating a representative bit stream in a frame format for distributing data in accordance with the present invention.

Referring to FIG. 3, a plurality of communication resource channels (Channel 1 through n) are shown in accordance with the present invention. In this instance, the over-the-air protocol frame format 300 of the XM Satellite Radio system is shown. This frame format 300 is based on a 432 millisecond frame as shown in FIG. 3 where each frame includes a frame header 103 and is subdivided into 8 kilobit per second sub-channels 102. These sub-channels 102 can be dynamically grouped to form higher bit rate payload channels 104. The payload channel or communication resource 104 provides the necessary bandwidth to transport a high-quality digital audio signal to the listener as well as other data as will become more apparent. When a listener changes channels, a receiver in accordance with the present invention simply extracts a different payload channel from the frame 300. It should be noted that each receiver in the XM Satellite System has a unique identifier allowing for the capability of individually addressing each receiver over-the-air to enable or disable services or to provide custom applications such as individual data services or group data services. The frame may also include a broadcast information channel among channels 1-n which contains information about the remaining channels in the frame. Such information can include descriptors such as song title, artist, composer, lyricist, label, album name, genre (e.g., Latin), sub-genre (e.g., Salsa), length, lyric keywords or any combination thereof. Alternatively, each of the channels in the frame can contain such descriptors for its respective channel in an auxiliary data field for example.

Figure 4:
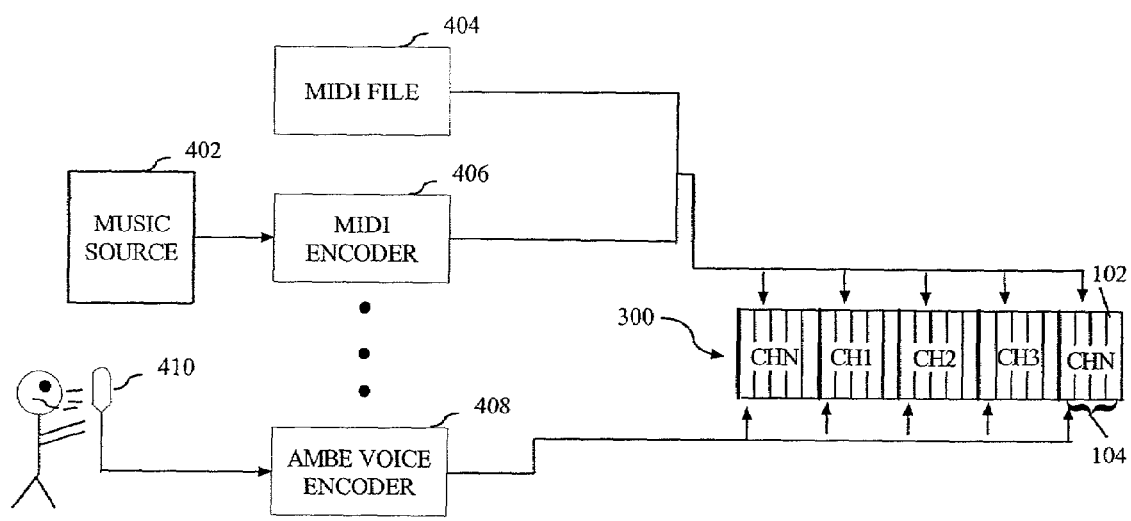
FIG. 4 is a diagram illustrating a radio broadcast transmission configuration in accordance with the present invention.
Figure 5:
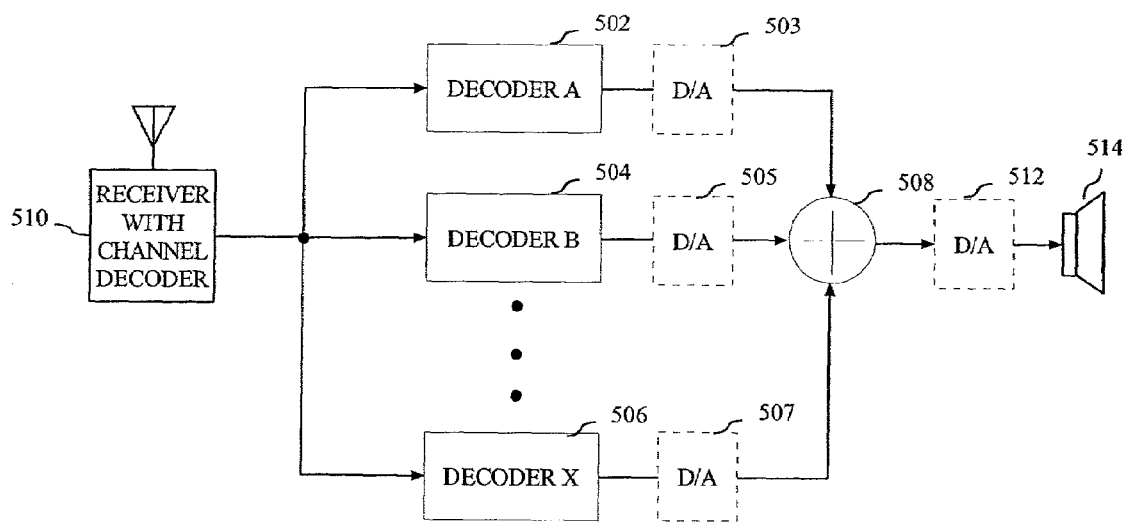
FIG. 5 is a block diagram of a radio receiver unit able to combine audio channels in accordance with the present invention.

In accordance with the present invention, a receiver can combine digital content on various sub-channels 102 or alternatively can combine digital content on various payload channels 104. It should be understood in the claims that channel can refer to either a sub-channel or a payload channel as described above. Referring to FIGS. 4 and 5, a system for combining a plurality of streaming data channels preferably comprises at least two encoders such as a MIDI encoder 406 and AMBE voice encoder 408 for producing streaming data on the plurality of streaming data channels 102 (or 104) as shown in broadcast studio 400. In this instance, music from music source 402 is encoded by the MIDI encoder 406 and optionally combined with the MIDI file 404 to provide the streaming data channel (or sub-channel) containing midi music. The AMBE voice encoder receives voice input from a microphone 410 and provides the streaming data channel (or sub-channel) containing voice. Preferably, the frame 300 is transmitted (transmitter not shown) in a time division multiplex signal containing the streaming data on the plurality of data channels. Referring to FIG. 5, a receiver unit 500 for receiving the streaming data on the plurality of streaming data channels from the time division multiplex signal preferably comprises a receiver 510 for receiving the plurality of streaming data channels. Preferably, the streaming data on each of the plurality of streaming data channels is a compressed low bit rate data signal although higher bit rate signals is also contemplated within the scope of the present invention. The receiver 510 preferably includes a channel decoder for decoding the time division duplex signal. The receiver unit 500 further comprises at least one decoder (such as decoders 502, 504 and 506) for decoding at least two of the plurality of streaming data channels to provide a plurality of decoded signals. A single decoder having sufficient processing power can process multiple streaming data channels, but separate decoders may be preferable for different types of encoded data. For example, if MIDI data was sent on a first given sub-channel or a predetermined payload channel such data could be decoded by a decoder 502 which preferably is a MIDI decoder. Likewise, if AMBE data was sent on a second given sub-channel or another predetermined payload channel, the data could be decoded by another decoder 504 which preferably is an AMBE decoder. Text data could also be sent on a yet another sub-channel or payload channel and another decoder such as decoder 506 could perform text-to-speech conversion. Of course, the present invention is not limited to three decoders nor is it limited to the types of decoders disclosed. Although any number of decoders for decoding different encoded data could conceivably be used, the likelihood that the resulting audio signal will be degraded goes in hand with the greater number of signals combined. After decoding, a combiner 508 could be used for combining the plurality of decoded signals (whether MIDI, AMBE text-to-voice, or otherwise) to provide a combined signal. The combiner can be a digital or analog mixer as will be explained below with reference to FIG. 6. The receiver unit 500 preferably further comprises either a plurality of digital-to-analog converters (503, 505, 507) for providing an analog signal for each of the plurality of streaming data channels (before combining or mixing the digital signal) or alternatively a digital-to-analog converter 512 for converting the combined signal (after combining or mixing) from a digital signal to an analog audio output signal for outputting the combined signal as audio via speaker 514 for example.

Referring to FIG. 6, a flow chart illustrating a method 600 of combining a plurality of streaming data channels is shown. The method 600 preferably comprises the steps of receiving (602) the plurality of streaming data channels over the air in a time division multiplex signal, wherein the streaming data channels is a digitally encoded bit stream that is preferably received from a satellite digital audio radio system (although the present invention is not limited thereto and can equally be applicable to terrestrial systems). Next, the method decodes the time division multiplex signal wherein at least two of the plurality of streaming data channels are further decoded at step 604 to provide a plurality of decoded signals. The step of converting the streaming data channels from digital signals to analog signals can take place either before or after combining the plurality of decoded signals as shown by alternative steps 606 and 610. If the streaming data channels are converted to analog before combining the plurality of decoded signals, then an analog mixer is used to provide the combined signal at step 608. If the streaming data channels are converted to analog after the combining step 608, a digital mixer will likely be used at step 608. In any event, the combined signal will then be provided as an audio output at step 612. As noted above, the streaming data channels can contain any combination of MIDI data, voice data, text-to-speech data, or other digitally encoded data. The mixing or combining in effect allows such a receiver to overlay voice on top of music at a relatively low bit rate that uses minimal bandwidth. Another use could include the mixing of voices from a talk show where the voices originate from various sources and can be separately encoded at the broadcast studio and then combined at a receiver using multiple decoders. Alternatively, the voices could be combined at the studio as well for delivery on one channel and combined with background music on another channel for separate decoding of music and voice at the receiver.

The description above is intended by way of example only and is not intended to limit the present invention in any way except as set forth in the following claims.

We claim:

1. A method of combining a plurality of streaming data channels, comprising the steps of:
    receiving the plurality of streaming data channels over the air in a time division multiplex signal including at least one streaming data channel containing MIDI data and at least one streaming data channel containing voice data in the form of text-to-speech data;
    decoding the time division multiplex signal wherein at least two of the plurality of streaming data channels are further decoded using a MIDI decoder for decoding MIDI data and a AMBE decoder for decoding text to speech data to provide a plurality of decoded signals;
    combining the plurality of decoded signals containing at least MIDI data and voice data to provide a combined signal; and
    outputting the combined signal as audio.

2. The method of claim 1, wherein the method further comprises the step of converting the plurality of streaming data channel from a digital signal to an analog signal before combining the plurality of decoded signals.

3. The method of claim 1, wherein the method further comprises the step of converting the plurality of streaming data channels from a digital signal to an analog signal after combining the plurality of decoded signals.

4. The method of claim 1, wherein the plurality of streaming data channels are received as a single stream over the air.

5. A receiver unit capable of combining a plurality of streaming data channels, comprises:
    a receiver and a channel decoder for receiving over the air in a time division multiplex signal the plurality of streaming data channels;
    at least one MIDI decoder that decodes MIDI data and at least one AMBE decoder that decodes text to speech data for decoding at least two of the plurality of streaming data channels to provide a plurality of decoded signals;
    a combiner for combining the plurality of decoded signals to provide a combined signal; and
    an audio output for outputting the combined signal as audio.

6. The receiver unit of claim 5, wherein the receiver unit further comprises a digital to analog converter for providing an analog signal for each of the plurality of streaming data channels.

7. The receiver unit of claim 5, wherein the receiver unit further comprises a digital to analog converter for converting the combined signal from a digital signal to an analog signal.

8. The receiver unit of claim 5, wherein the receiver includes a channel decoder.

9. The receiver unit of claim 5, wherein the plurality of streaming data channels are received over the air.

10. A system for combining a plurality of streaming data channels, comprises:
    at least two encoders for producing streaming data on the plurality of streaming data channels;
    at least one transmitter for transmitting in a time division multiplex signal the streaming data on the plurality of data channels; and
    a receiver unit for receiving the streaming data on the plurality of streaming data channels from the time division multiplex signal, wherein the receiver unit comprises:
        a receiver for receiving the plurality of streaming data channels;
        at least two decoders comprising at least one MIDI decoder that decodes MIDI data and at least one AMBE decoder that decodes text to speech data for decoding at least two of the plurality of streaming data channels to provide a plurality of decoded signals;
        a combiner for combining the plurality of decoded signals to provide a combined signal; and
        an audio output for outputting the combined signal as audio.

11. The system of claim 10, wherein the streaming data on each of the plurality of streaming data channels is a compressed low bit rate data signal.

12. The system of claim 10, wherein the receiver unit further comprises a digital to analog converter for providing an analog signal for each of the plurality of streaming data channels.

13. The receiver unit of claim 10, wherein the receiver unit further comprises a digital to analog converter for converting the combined signal from a digital signal to an analog signal.

14. The receiver unit of claim 10, wherein the at least two encoders encode voice inputs and the at least one decoder comprises at least two speech decoders.

15. The receiver unit of claim 10, wherein the at least one decoder comprises at least a speech decoder and at least a digital music decoder.

16. A method of combining a plurality of streaming data channels, comprising the steps of:

receiving the plurality of streaming data channels over the air in a time division multiplex signal including at least one streaming data channel containing MIDI data and at least one streaming data channel containing text data;

decoding the time division multiplex signal wherein at least two of the plurality of streaming data channels are further decoded using a MIDI decoder for decoding MIDI data and an AMBE decoder for decoding text to speech data to provide a plurality of decoded signals;

combining the plurality of decoded signals containing at least MIDI data and text data to provide a combined signal; and outputting the combined signal as audio.

* * * * *

UNITED STATES PATENT AND TRADEMARK OFFICE
CERTIFICATE OF CORRECTION

PATENT NO. : 7,075,946 B2 Page 1 of 1
APPLICATION NO. : 09/968945
DATED : July 11, 2006
INVENTOR(S) : Marko et al.

It is certified that error appears in the above-identified patent and that said Letters Patent is hereby corrected as shown below:

On Title Page, Col. 1
Item (54): Please replace title "Method and Apparatus for Audio Output Combining" with --SYSTEM AND METHOD FOR COMBINED AUDIO CHANNEL OUTPUTS--;

On Title Page Col. 2
Item (56): Please replace reference "6,907,020 B1 6/2005 Periyalwar et al 370/337" with --6,907,020 B2 6/2005 Periyalwar et al 370/337--;

Col. 5 line 54 Please replace "a AMBE" with --an AMBE--;

Col. 6 lines 66-67 Please replace "one decoder comprises" with --two decoders comprise--.

Signed and Sealed this

Nineteenth Day of September, 2006

JON W. DUDAS
*Director of the United States Patent and Trademark Office*